Patented Jan. 24, 1933

1,895,102

UNITED STATES PATENT OFFICE

GEORGE MAYHEW, OF COLLINGWOOD, VICTORIA, AUSTRALIA, ASSIGNOR TO DAVID PICKERING RODERICK ENDERSBY, OF MURRUMBEENA, VICTORIA, AUSTRALIA

PROCESS OF SKINNING PEARS AND OTHER RELATIVELY SOFT FRUIT

No Drawing. Application filed January 14, 1930, Serial No. 420,820, and in Australia February 14, 1929.

This invention relates to an improved process of skinning pears and other relatively soft fruits which are to be subsequently preserved or are to be pulped for the manufacture of jam.

Pears and other fruits of the soft variety are customarily skinned by operatives using cutting appliances. This method necessitates much handling of the fruit, which does not fulfill desired hygienic requirements. Moreover, it results in an appreciable waste of the fruit flesh.

By my invention there is provided a process for the removal of the skins of fruits, which process is quick, hygienic, economical and most effective.

According to the invention, the pears or other fruit are immersed in a scalding bath of water, lime and caustic soda. The lime is preferably newly burnt or quicklime and may be in such quantity as to form either a complete solution in water or a suspension therein. The quantity of lime ordinarily exceeds the amount of caustic soda, and the proportion of the former may be from five to ten times that of the latter. In one practical example, I use five pounds of lime and one pound of caustic soda to every twenty gallons of water. The mixture is heated to scalding temperature preferably by the use of steam.

The period of the immersion of the fruit depends upon the variety and degree of ripeness of the fruit, the toughness of the skins and other conditions, but for pears less than sixty seconds is usually found to be sufficient. The action of the bath causes expansion of the immersed fruit to take place. The caustic soda has a destructive action on the fibres of the skins, and the lime functions as a filler for the expanded pores of the skins.

The fruits when removed from the first treatment bath of scalding temperature are immersed in a second bath consisting of cold water, the effect of which is to cause contraction of the fruit flesh and the fruit skin. The fruit flesh contracts to a greater extent than does the skin having the lime filler in the pores thereof, so that the fruit when removed from the said second bath is found to have its skin loosened or separated from the fruit flesh by reason of the varying degrees of contraction. The loosened skin is subsequently removed cleanly and readily by subjecting the fruit to the action of a jet or jets of water.

Mechanical means may be provided for automatically depositing the fruit into the first bath, removing it therefrom and depositing it into the second bath, and for removing it from the latter bath and feeding it to an appliance equipped with a water jet or jets.

What I do claim is:—

1. An improved process of skinning soft fruits consisting in immersing the fruit in a hot bath containing an alkaline filler and an alkaline skin fibre destroying agent, immersing in a cold water bath, and washing the skin from the fruit by jets of cold water.

2. An improved process of skinning soft fruits according to claim 1, wherein the hot bath consists of twenty gallons of water, five pounds of lime, and one pound of caustic soda.

3. An improved process of skinning soft fruits consisting in immersing the fruit in a hot bath containing caustic soda and a saturated solution of lime, immersing in a second bath of cold water, and washing the skin from the fruit with jets of cold water.

In testimony whereof I affix my signature.

GEORGE MAYHEW.